United States Patent [19]
Aquila

[11] 3,770,149
[45] Nov. 6, 1973

[54] APPARATUS FOR TOWING WIDE VEHICLES

[76] Inventor: Joseph Aquila, 144-41 231st St., Queens, N.Y.

[22] Filed: Nov. 26, 1971

[21] Appl. No.: 202,200

[52] U.S. Cl. .............................. 214/86 A, 280/402
[51] Int. Cl. ............................................. B60p 3/12
[58] Field of Search..................... 214/86 A; 280/402

[56] References Cited
UNITED STATES PATENTS

| | | |
|---|---|---|
| 2,497,379 | 2/1950 | Vandergrift, Sr. et al. ........ 214/86 A |
| 2,951,601 | 9/1960 | Castoe .............................. 214/86 A |
| 2,555,663 | 6/1951 | Schouboe ......................... 214/86 A |
| 3,539,062 | 11/1970 | Allen ................................. 214/86 A |
| 3,152,814 | 10/1964 | Wegener et al............... 214/86 A X |

*Primary Examiner*—Albert J. Makay
*Attorney*—Ostrolenk et al.

[57] ABSTRACT

Truck mounted crane-type apparatus for towing relatively wide and heavy wrecks or otherwise disabled vehicles is constructed with an adjustable length spacer bar extending from the rear of the towing vehicle and secured to the towed vehicle to maintain these vehicles spaced apart especially during turning. The rear end of the spacer bar is mounted to a generally horizontal pivot disposed at right angles to the longitudinal axis of the towing vehicle, and the front end of the spacer bar supports a tow bar on a joint means that provides mutually perpendicular pivot axes about which the tow bar is pivotable, relative to the spacer bar. One of these pivot axes extends along the longitudinal axis of the spacer bar, and when this pivot axis is horizontal, the other of these pivot axes is vertical.

In one mode of operation, a fixed length cable passing over a pulley mounted to the movable rear end of the crane boom is secured at its ends to fixed points on the tow bar, with these points disposed on opposite sides of the tow bar conection to the spacer bar. This permits pivoting of the tow bar about the other of said axes and provides means for lifting the tow bar as the rear end of the boom is raised. In another mode of operation, the fixed length cable is replaced by a winch having a cable which passes over a guide pulley secured to the boom at the rear end thereof, with this cable being secured to the tow bar at the same spaced points where the ends of the fixed length cable were secured.

19 Claims, 4 Drawing Figures

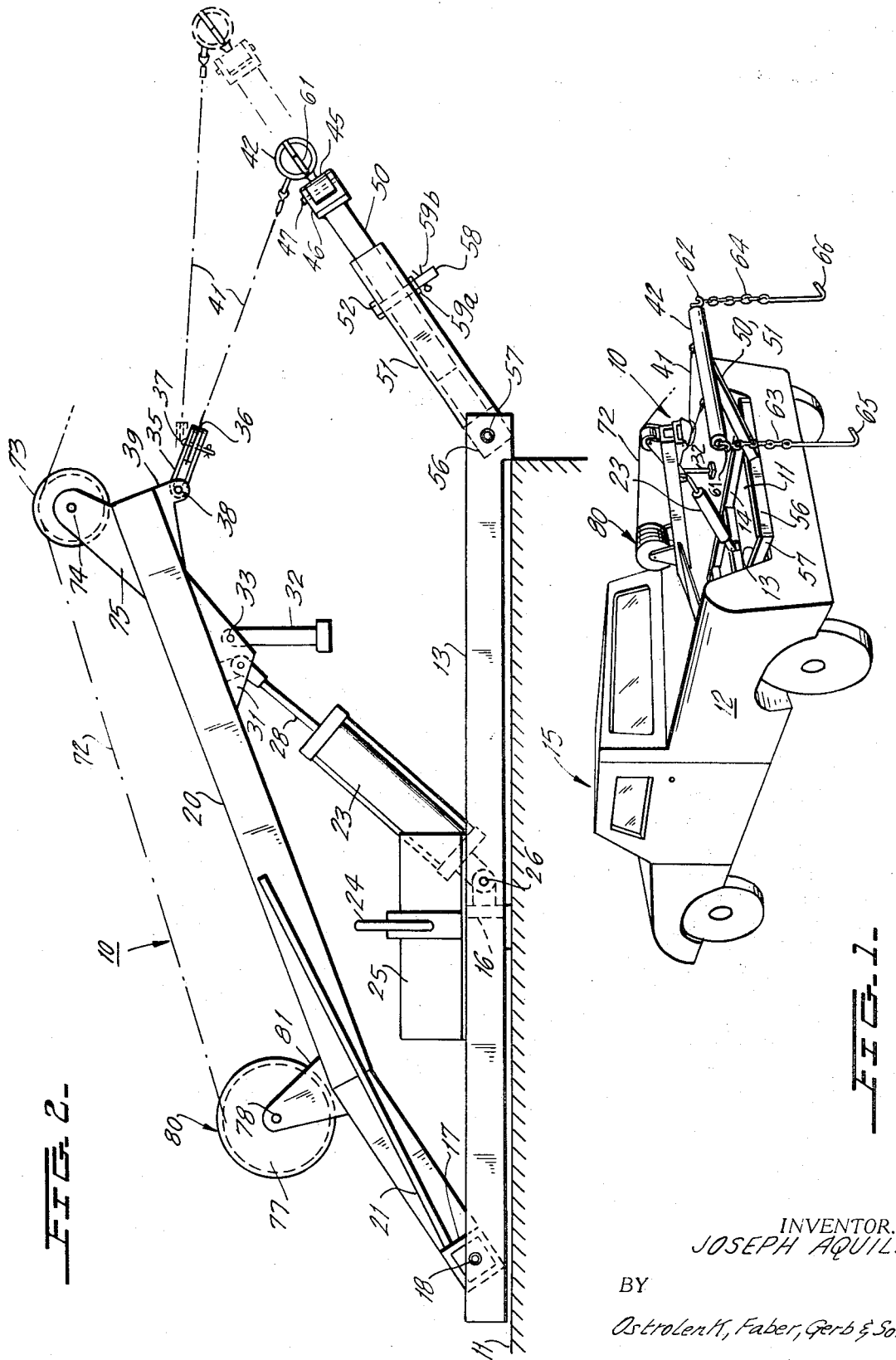

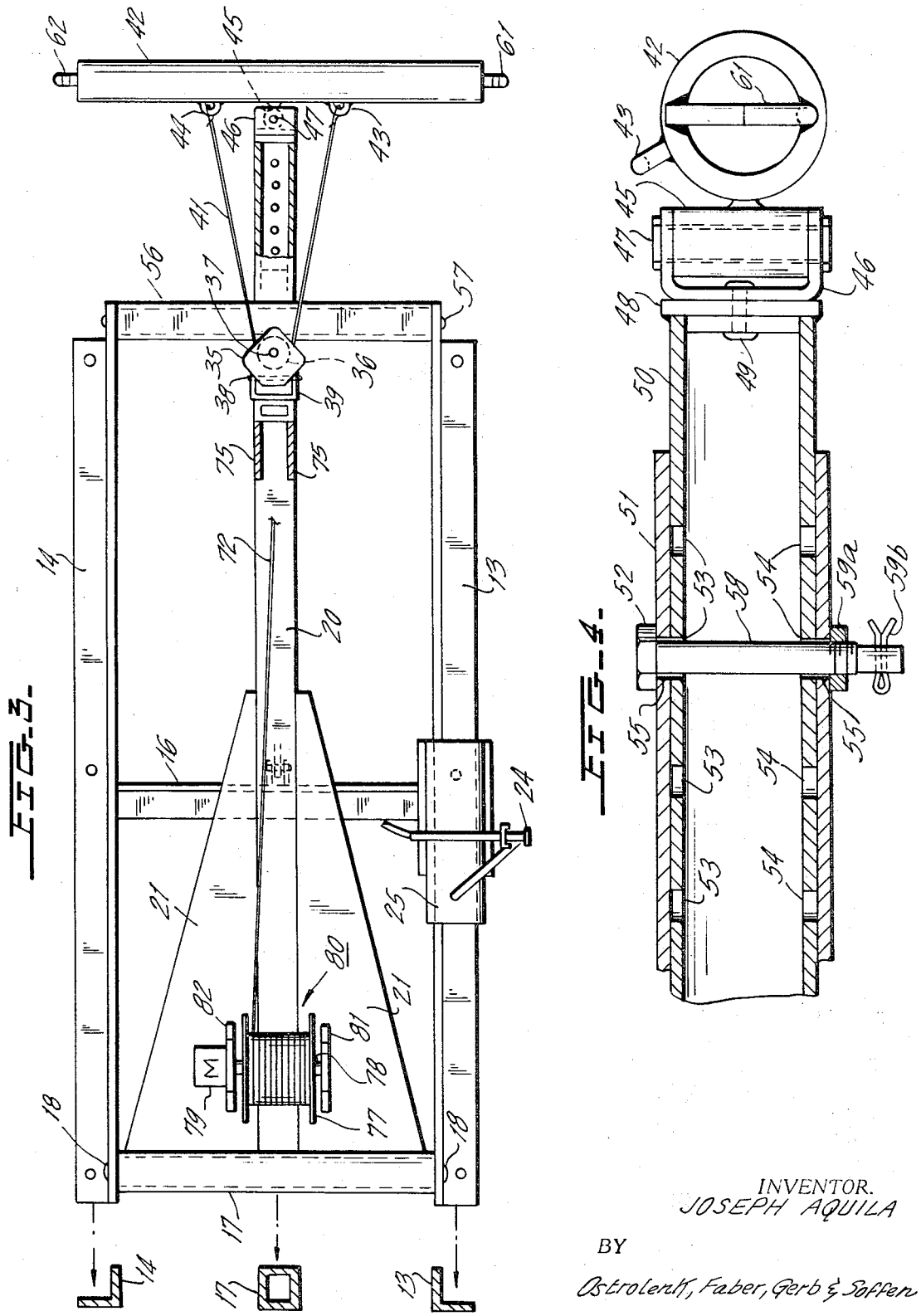

APPARATUS FOR TOWING WIDE VEHICLES

This invention relates to crane apparatus in general, and more particularly relates to a truck mounted crane for towing a relatively heavy and wide vehicle.

The towing of relatively wide vehicles requires the maintaining of minimum spacings between the towing and towed vehicles, so that turns may be negotiated without the towed vehicle colliding with the towing vehicle. It has been found that merely extending the crane boom beyond the end of the towing vehicle, while possibly solving the turning problem, results in other problems, such as poor control over the towed vehicle, so that the latter is very likely to collide with the towing vehicle when the towing vehicle is stopped.

Thus, the instant invention, as does the prior art, provides a spacer bar projecting from the rear of the towing vehicle, and having its rear end secured to a horizontal pivot and having its front end support a rigid tow bar. In accordance with the instant invention, the spacer bar is adjustable so that spacing between the towed and towing vehicles may be made no greater than the space required by the relative sizes of these vehicles. The tow bar end of the spacer bar is provided with pivot means which permits the tow bar to tilt about a generally vertical axis as well as to tilt side-to-side, the latter motion being particularly important when the towed and towing vehicles are twisted in opposite sideways directions with respect to the towing direction.

These objects as well as other objects of this invention will become readily apparent after reading the following description of the accompanying drawings, in which:

FIG. 1 is a perspective showing the towing apparatus of the instant invention mounted to a tow truck.

FIG. 2 is a side elevation of the towing apparatus of FIG. 1.

FIG. 3 is a plan view of the towing apparatus.

FIG. 4 is an enlarged fragmentary portion, partially sectioned, showing the rear of the extendable spacer bar.

Now referring to the figures. Towing apparatus 10 is adapted to be mounted on loading bed 11 at the rear of truck body 12. In particular, apparatus 10 includes a generally rectangular base whose sides are constituted by longitudinal angle iron frame members 13, 14 which rest on bed 11 and are bolted or otherwise fixedly secured to the frame of truck 15. Fixed transverse angle iron base or frame member 16, located at the mid-region of members 13, 14, together with transverse tubular base or frame end members 17, 56 maintain side members 13, 14 in proper spaced parallel relation. Tubular frame member 17 is mounted to pivots 18 at the front ends of members 13, 14. Tubular boom 20 extends in a plane perpendicular to the longitudinal axis of member 17 and is fixedly secured to member 17 at the center thereof. Triangular steel plates 21 are secured to opposite sides of boom 20 and are also secured to transverse frame member 17 to prevent twisting of boom 20 with respect to member 17.

The rear end of boom 20 is raised and lowered under the control of power cylinder 23 through the manual operation of control 24 mounted to fluid reservoir 25. The lower end of cylinder 23 is pivotally mounted at 26 to bracket 27 secured to central frame member 16 and extending to the rear thereof. Extendable arm 28 of power cylinder 23 is pivotally mounted to pin 29 extending between spaced brackets 31 secured to the lower surface of boom 20. Stiff leg 32 is pivotally mounted at pin 33 extending between brackets 31 and serves as a safety device to limit uncontrolled downward movement of boom 20 in the event power cylinder 23 leaks or otherwise malfunctions.

U-shaped holder 35, which rotatably mounts sheave 36 on removable pin means 37, is pivotally mounted to horizontal pin 38 extending between the arms of inverted U-shaped bracket 39 secured to the lower surface of boom 20 at the rear thereof. Sheave 36 guides cable 41 having its respective ends fixedly secured to transverse tow bar 42 by being looped through eyes 43, 44 fixedly secured to tow bar 42 on opposite sides of its centrally located swivel block 45.

Block 45 is entered between the arms of U-shaped bracket 46 and is pivoted on pin 47 which extends between such arms. The web portion of bracket 46 abuts cover plate 48 at the rear of internal extendable spacer bar element 50 and is pivotable with respect thereto on pin 49. Hooks 61, 62 at opposite ends of tow bar 42 are adapted to hold chains 63, 64 having hooks 65, 66 secured, with the latter being adapted to engage the steering control arms or other suitable elements of the vehicle being towed.

Outer tubular spacer member 51 receives inner tubular spacer member 50, with the latter extending to the rear of the former. Spacer member 51 projects at right angles to tubular transverse frame member 56 and is welded thereto at the center thereof. Pins 57 at opposite ends of transverse frame member 56 are secured to longitudinal frame members 13, 14 at the rear thereof, and constitute a generally horizontal pivot means for member 56 and spacer bar means 50, 51.

Inner spacer bar member 50 is provided with a plurality of adjusting holes 53 and another plurality of adjusting holes 54 in transverse alignment with holes 53. Outer spacer bar member 51 is provided with a single pair of transversely aligned apertures 55. The length of spacer bar means 50, 51 is maintainted in adjusted position by removable pin means in the form of bolt 58 which extends through apertures 55 and those apertures 53, 54 aligned therewith. Nut 59a is threadably mounted to bolt 58 at the lower end thereof and is maintained against accidental dismounting by cotter pin 59b.

In operation, raising and lowering of boom 20 causes fixed length cable 41 to raise and lower tow bar 42 by pivoting spacer bar means 50, 51 about horizontal pivot 57 at the rear of spacer bar means 50, 51. Should the towed vehicle tilt side to side without corresponding tilting of tow truck 15, this relative motion will be compensated for through the tilting of tow bar 42 about pin 49, the latter being located on the longitudinal axis of spacer bar means 50, 51. When tow truck 15 is negotiating a turn, tow bar 42 pivots about pin 47 as an axis to compensate for the misalignment between the towed and towing 15 vehicles.

For special situations, fixed length cable 41 is disconnected from boom 20, and winch cable 72 is extended over pulley 73 and looped through tow bar eyes 43, 44. Pulley 73 is rotatably mounted on pin 74 that extends between spaced arms 75 projecting upward from boom 20 at the rear thereof. Cable drum 77 for winch 80 is mounted to shaft 78 driven by electric motor 79, and extends between spaced bracket 81, 82 secured to the upper surfaces of stabilizer plates 21, 21.

When towing apparatus 10 is not in use, adjustable length spacer bar means 50, 51 is reduced to its shortest length and then pivoted counter-clockwise with respect to FIG. 2 about pivot 57 until spacer bar means 50, 51 rests on truck bed 11. As boom 20 is lowered, stiff leg safety device 32 is pivoted counter-clockwise about pin 33 to prevent boom 20 from being moved very close to truck bed 11. It is noted that even though power cylinder 23 is capable of operating boom 20 to the raised position shown in FIGS. 1 and 2, in practice, during towing, chains 63 and 64 are shorter than illustrated and the rear end of boom 20 is usually in a much lower position. Preferably, in this much lower position, the lower end of stiff leg 32 rests against truck bed 11.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows.

1. Apparatus mounted to a towing vehicle and removably connectable to a vehicle to be towed; said apparatus including a boom mounted for movement in a generally vertical plane; rigid elongated spacer means extending rearward from the rear of a towing vehicle; said spacer means being pivoted at its front end about a generally horizontal axis so that the rear end of said spacer means is movable in said vertical plane; tow bar means connected at its mid-region to said spacer means at its said rear end; means operatively connecting said boom and said spacer means at the rear of the latter; means operatively connected to said boom for raising and lowering said rear end of said spacer means; means defining first and second pivotal axes for said tow bar means whereby the latter is free to pivot and thereby compensate for both longitudinal and side-to-side tilting misalignment between towed and towing vehicles; said spacer means being selectively adjustable in length in accordance with the width of a vehicle being towed; a framelike base including spaced side members adapted to be fixedly secured to a towing vehicle; first means defining said generally horizontal axis and second means defining another generally horizontal axis extending parallel to the other generally horizontal axis; said first means secured to said base at the rear of said side members and said second means secured to said side members forward of said first means; said boom having its front end secured to said second means to constitute a center about which said boom pivots.

2. Apparatus as set forth in claim 1 in which the means defining the first and second pivotal axes are both disposed at said rear end of said spacer means.

3. Apparatus as set forth in claim 1 in which the spacer means includes first and second elongated members; said first member connected at the front thereof to said horizontal axis and said second member connected at the rear thereof to said tow bar means; said second member, through axial movement thereof, being adjustable relative to said first member; and means for maintaining said second member in its adjusted position.

4. Apparatus as set forth in claim 3 in which one of said members is tubular and the other of said members is telescoped within said one member; said means for maintaining said second member in its adjusted position including removable pin means disposed within aligned apertures in said members; said apertures extending transverse to the longitudinal axes of said members.

5. Apparatus as set forth in claim 3 in which the means defining the first and second pivotal axes are both disposed at said rear end of said spacer means.

6. Apparatus as set forth in claim 5 in which the means operatively connecting said boom and said spacer means includes a cable operatively connected between said boom and points on said tow bar means disposed on opposite sides of said mid-region; a pulley mounted to said boom at the rear thereof; said cable passing over said pulley and having opposite ends thereof anchored to said points on said tow bar.

7. Apparatus as set forth in claim 4 in which the means operatively connecting said boom and said spacer means includes a cable operatively connected between said boom and points on said tow bar means disposed on opposite sides of said mid-region; a pulley mounted to said boom at the rear thereof; said cable passing over said pulley and having opposite ends thereof anchored to said points on said tow bar.

8. Apparatus as set forth in claim 1 in which the means operatively connecting said boom and said spacer means includes a cable operatively connected between said boom and points on said tow bar means disposed on opposite sides of said mid-region.

9. Apparatus as set forth in claim 8 in which there is a pulley mounted to said boom at the rear thereof; said cable passing over said pulley and having opposite ends thereof anchored to said points on said tow bar.

10. Apparatus as set forth in claim 1 also including winch means having a relatively long lifting cable, and a guide pulley for said lifting cable; said guide pulley being mounted to the boom at the rear thereof; said lifting cable being selectively connectable to control raising and lowering of said tow bar means; and another cable normally extending between said boom and said tow bar means, and constituting at least part of a selectively separable operative connection to control raising and lowering of said tow bar means; both said lifting cable and said another cable comprising said means operatively connecting said boom and said spacer means.

11. Apparatus as set forth in claim 2 in which the means defining the first and second pivotal axes includes respective first and second pin means generally perpendicular to each other.

12. Apparatus as set forth in claim 1 in which said first means includes a rear transverse base member pivotally mounted to said side members and having the front end of the spacer means connected thereto.

13. Apparatus as set forth in claim 12 in which the spacer means is fixedly secured to said rear transverse base member and is generally at right angles thereto at a point substantially midway between the ends thereof.

14. Apparatus as set forth in claim 13 in which said second means includes front transverse base member means extending between said side members.

15. Apparatus mounted to a towing vehicle and removably connectable to a vehicle to be towed; said apparatus including a boom mounted for movement in a generally vertical plane; rigid elongated spacer means extending rearward from the rear of a towing vehicle; said spacer means being pivoted at its front end about a generally horizontal axis so that the rear end of said spacer means is movable in said vertical plane; tow bar means connected at its mid-region to said spacer means at its said rear end; means operatively connecting said boom and said spacer means at the rear of the latter; means operatively connected to said boom for raising and lowering said rear end of said spacer means; means defining first and second pivotal axes for said tow bar means whereby the latter is free to pivot and thereby compensate for both longitudinal and side-to-side tilting misalignment between towed and towing vehicles; said spacer means being selectively adjustable in length in accordance with the width of a vehicle being towed, which means having a relatively long lifting cable, and a guide pulley for said lifting cable; said guide pulley being mounted to boom at the rear thereof; said lifting cable being selectively connectable to control raising and lowering of said tow bar means; and another cable normally extending between said boom and said tow bar means, and constituting at least part of a selectively separable operative connection to control raising and lowering of said tow bar means; both said lifting cable and said another cable comprising said means operatively connecting said boom and said spacer means.

16. Apparatus mounted to a towing vehicle and removably connectable to a vehicle to be towed; said apparatus including a boom mounted for movement in a generally vertical plane; rigid elongated spacer means extending rearward from the rear of a towing vehicle; said spacer means being pivoted at its front end about a generally horizontal axis so that the rear end of said spacer means is movable in said vertical plane; tow bar means connected at its mid-region to said spacer means at its said rear end; means operatively connecting said boom and said spacer means at the rear of the latter; means operatively connected to said boom for raising and lowering said rear end of said spacer means; means defining first and second pivotal axes for said tow bar means whereby the latter is free to pivot and thereby compensate for both longitudinal and side-to-side tilting misalignment between towed and towing vehicles; said spacer means being selectively adjustable in length in accordance with the width of a vehicle being towed; said means operatively connecting said boom and said spacer means including a cable operatively connected between said boom and points on said tow bar means disposed on opposite sides of said mid-region; a pulley mounted to said boom at the rear thereof; said cable passing over said pulley and having opposite ends thereof anchored to said points on said tow bar.

17. Apparatus as set forth in claim 16 in which the spacer means includes first and second elongated members; said first member connected at the front thereof to said horizontal axis and said second member connected at the rear thereof to said tow bar means; said second member, through axial movement thereof, being adjustable relative to said first member; and means for maintaining said second member in its adjusted position.

18. Apparatus as set forth in claim 17 in which the means defining the first and second pivotal axes are both disposed at said rear end of said spacer means.

19. Apparatus as set forth in claim 16 also including a framelike base including spaced side members adapted to be fixedly secured to a towing vehicle; first means defining said generally horizontal axis and second means defining another generally horizontal axis extending parallel to the other generally horizontal axis; said first means secured to said base at the rear of said side members and said second means secured to said side members forward of said first means; said boom having its front end secured to said second means to constitute a center about which said boom pivots.

* * * * *